United States Patent
Hao et al.

(10) Patent No.: US 9,258,584 B2
(45) Date of Patent: Feb. 9, 2016

(54) VIDEO CONTENT PROTECTION

(71) Applicant: Verizon Patent and Licensing Inc., Basking Ridge, NJ (US)

(72) Inventors: Jianxiu Hao, Acton, MA (US); Xuefeng Yao, Weston, MA (US); Jian Huang, Sudbury, MA (US); Yuhui Qian, Lexington, MA (US); Jyothikumar Jagannathan, Wesley Chapel, FL (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 105 days.

(21) Appl. No.: 14/087,238

(22) Filed: Nov. 22, 2013

(65) Prior Publication Data

US 2015/0150038 A1 May 28, 2015

(51) Int. Cl.
| | |
|---|---|
| H04N 7/167 | (2011.01) |
| H04N 21/254 | (2011.01) |
| H04N 21/239 | (2011.01) |
| H04N 21/258 | (2011.01) |
| H04N 21/266 | (2011.01) |
| H04N 21/4405 | (2011.01) |
| H04N 21/4627 | (2011.01) |
| H04N 21/845 | (2011.01) |
| H04N 21/81 | (2011.01) |
| H04N 21/6377 | (2011.01) |
| H04N 21/6334 | (2011.01) |
| G06F 21/00 | (2013.01) |

(52) U.S. Cl.
CPC ............ *H04N 21/2541* (2013.01); *G06F 21/00* (2013.01); *H04N 21/2393* (2013.01); *H04N 21/25816* (2013.01); *H04N 21/26613* (2013.01); *H04N 21/4405* (2013.01); *H04N 21/4627* (2013.01); *H04N 21/63345* (2013.01); *H04N 21/63775* (2013.01); *H04N 21/8133* (2013.01); *H04N 21/8455* (2013.01)

(58) Field of Classification Search
CPC .. H04N 7/1675; H04N 7/163; H04N 21/4181
See application file for complete search history.

(56) References Cited

U.S. PATENT DOCUMENTS

| | | | | |
|---|---|---|---|---|
| 2008/0092181 | A1* | 4/2008 | Britt | 725/87 |
| 2011/0202844 | A1* | 8/2011 | Davidson et al. | 715/723 |
| 2012/0060031 | A1* | 3/2012 | Huang | H04L 9/083 713/168 |
| 2012/0079577 | A1* | 3/2012 | Hao et al. | 726/7 |

* cited by examiner

*Primary Examiner* — Nathan Flynn
*Assistant Examiner* — Alfonso Castro

(57) ABSTRACT

A method includes receiving, by a client device associated with a particular user, product details for video content including a purchase option identifier (ID) for the video content from a video service provider. The method includes requesting, by the client device based on a single sign on (SSO) protected call, a playback uniform resource locator (URL) for the video content from an orchestration layer associated with the video service provider. The method also includes receiving the playback URL, an entitlement ID associated with the particular user for the video content, and the encrypted content. The method includes obtaining a digital rights management (DRM) license for the encrypted content based on the entitlement ID, and decrypting and playing the video content based on DRM rules associated with the video content.

20 Claims, 8 Drawing Sheets

VIDEO CONTENT PROTECTION

BACKGROUND

Video service providers currently provide multiple services and programs, including cable television, network television, and video-on-demand content, to their customers. Video service providers manage relationships with their customers using customer accounts that correspond to the multiple services. Individual customers may receive combinations of these services from video service providers based on particular rights to content associated with the customers.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Systems and/or methods described herein may implement video content protection based on DRM for video content and entitlement protection that ensures that only authorized devices associated with entitled end users receive a license to view (or otherwise access) the video content. The systems may ensure that the end users that have been identified as entitled to the content. For example, registration-based or single sign on (SSO)-based protections may be implemented to ensure that a license to view the video content is distributed to only those persons who have the right to play the content. Additionally, limited duration (i.e., short-lived) entitlement tokens may be implemented to enforce the entitlement process.

Consistent with embodiments, the system may track the number of simultaneous streams of each user account in accessing the video content. The system may apply restrictions provided by the content provider (e.g., a studio) and/or other DRM rules in limiting the total number streams that a user can watch at the same time.

As used herein, the terms "user," "consumer," "subscriber," and/or "customer" may be used interchangeably. Also, the terms "user," "consumer," "subscriber," and/or "customer" are intended to be broadly interpreted to include a user device or a user of a user device.

Figure 1:
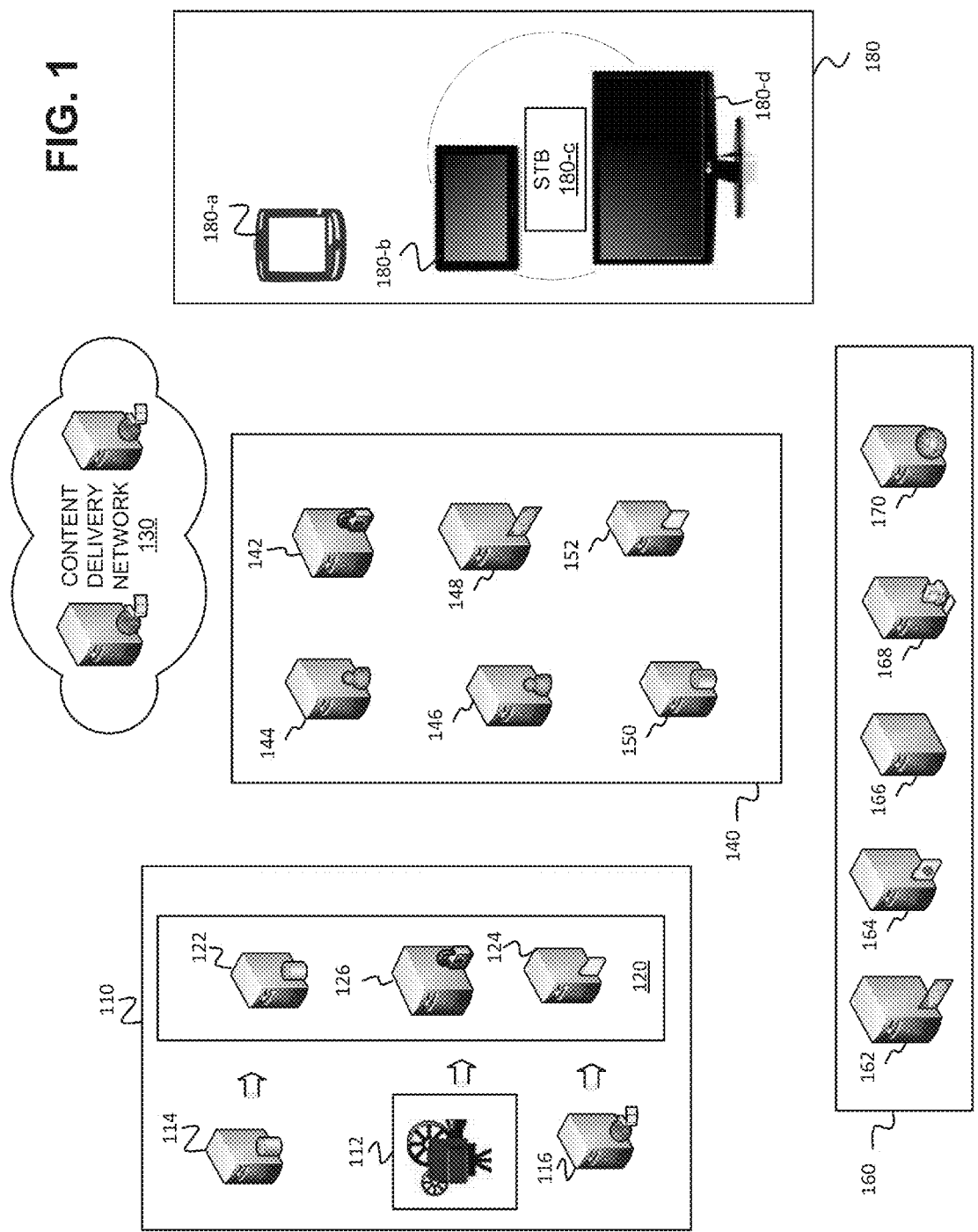
FIG. 1 illustrates an exemplary environment in which systems and methods described herein may be implemented.

FIG. 1 illustrates an exemplary environment 100 in which systems and/or methods described herein may be implemented. As shown in FIG. 1, environment 100 may include a video content system 110, a content delivery network 130, an orchestration layer (or orchestration system) 140, a backend services system 160 and "front end" client devices 180. Devices and/or networks of FIG. 1 may be connected via wired and/or wireless connections.

Video content system 110 may collect, generate, and provide video content to subscribers/recipients of a video service. Video content may include, for example, encoded video content in any of a variety of formats, including, for example, Multiview Video Coding (MVC), Moving Picture Experts Group (MPEG)-2 TS, MPEG-4 advanced video coding (AVC)/H.264. Video content system 110 may include different video content sources, such as a content provider 112, a marketing console 114, or physical assets 115 (e.g., digital video discs (DVDs), etc.), which may provide video content to be processed and distributed to subscribers, and a content processing system 120, which may process the content to be provided to subscribers.

Content provider 112 may include one or more providers of video content. For example, content provider 112 may include a movie studio, a television network, a cable television station, a film distributor, etc. Content provider 112 may provide video content to content processing system 114 in a variety of signals and formats, such as a baseband video signal, MPEG video, etc.

Content processing system 120 may store and process video content received from content providers 112 (and/or other content sources). Content processing system 120 may include devices that process the video content such as a preprocessing server 122, a transcoding server 124, and an encryption server 126. Content processing system 120 may aggregate video content from different content providers 112 and distribute the video content through networks, such as content delivery network 130, to client devices 180.

Preprocessing server 122 may convert input video content into a standardized format according to the content process engine's requirement. Preprocessing server 122 may merge digital assets from content providers 112 and physical asset 116 from partner entities. Preprocessing server 122 may also allow a video service provider to apply business rules via marketing console 114 (e.g., product descriptions, price, etc.).

Transcoding server 124 may convert video content into proper formats for different types of client devices 180 (i.e., consumer devices) to access and/or play. The output files may be single files per video content item (e.g., a large video file for a movie) or a series of small segment files for streaming. The segment files may have different resolution to enable different bit rate video streams to be delivered to client devices 180 according to available network bandwidth for adaptive streaming. In some instances, transcoding server 124 may support multiple different types of data files. Transcoding server 124 may transcode assets into appropriate (i.e., device compatible) digital formats for client devices 180 to consume. For example, transcoding server 124 may support hypertext transfer protocol (HTTP) live streaming (HLS) and Microsoft™ smooth streaming (SS).

Encryption server 126 may apply DRM rules to encrypt content so that only entitled users and authorized devices can consume the video content. For example, encryption server 126 may apply DRM rules associated with particular platforms through which the video content may be distributed. Encrypted content may be distributed through content delivery network 130 or other channels (e.g., via the Internet).

Encrypted content may include protections so that the video content only be consumed by users who have decryption key (stored in DRM license) to watch the video content on designated devices which support the DRM protections. Encryption server 126 may also encrypt data by DRM rules to enforce particular digital rights (e.g., limited transferability of the video content, limited copying, limited views, etc.). Encryption server 126 may apply different DRM rules for different types of content (e.g., different rules for HLS content and streaming content).

Content delivery network 130 may deliver encrypted digital video content and images to client devices 180. Content delivery network 130 may be distributed geographically per user demands in different locations. Content delivery network 130 may be mapped according to user's Internet service provider (ISP) locations. Content delivery network 130 may contain content distribution origin servers, edge distribution servers and distribution appliances.

Orchestration layer 140 may provide an interface from client devices 180 to systems associated with a video service provider through orchestration layer application programming interfaces (APIs). Orchestration layer 140 may support interactions between client devices 180 and servers associated with the video service provider. Orchestration layer 140 may determine particular formats to be used according to the device type of the client device 180 that requests, plays or otherwise accesses the video content. Orchestration layer 140 may also aggregate content from different servers per requests received from client devices 180. Orchestration layer 140 may also cache some video content locally for performance purposes. In some instances, orchestration layer 140 may perform as a primarily passing-though layer and may be configured to store video content only temporarily (i.e., for a limited time and never permanently).

Orchestration layer 140 may include (or provide an interface with) a DRM license server 142, an entitlement server 144, a catalog server 146, a storefront server 148, a transaction history server 150, and an account profile server 152.

DRM license server 142 may interact with content processing system 120 to ensure video content items are encrypted according to DRM rules. DRM license server 142 may issue, validate, and enforce the DRM licenses to client devices 180 during content distribution. DRM license server 142 may distribute DRM licenses which may include a content decryption key so that encrypted video content delivered from content delivery network 130 may be unlocked for client device 180 to play.

Entitlement server 144 may store rules indicating particular video content purchased and client devices 180 on which the user may view the video content in user profiles associated with particular users such as described below with respect to FIG. 5. Entitlement server 144 may include an entitlement database that contains a list of video catalog items (i.e., video content) available for purchase, rental, or subscription. Entitlement server 144 may ensure that the entitlement to view encrypted video content listed in the entitlement database is verified before a DRM license key is issued to authorized client devices 180 associated with the particular users. Entitlement server 144 may perform an entitlement check prior to orchestration layer 140 issuing the content download Uniform resource locator (URL) from content delivery network 130 so that only entitled users may access encrypted content.

Catalog server 146 may include a unified video catalog of video of both digital and physical content that is available for users to buy, rent or subscribe. Catalog server 146 may allow the user to search the video catalog by keyword(s) or browse the product list. In some instances, catalog server 146 may also provide recommendations based on the user's profile, viewing history or purchased content. Catalog server 146 may also recommend physical assets based on the digital viewing history or personal preferences of the user.

Storefront server 148 may support browsing functions and searching of the video content catalog. Storefront server 148 may include a digital shopping cart, transaction management, promotions and advertisements. Storefront server 148 may link to backend billing and transaction systems (e.g., billing server 166).

Transaction history server 150 may store a transaction history associated with each user and bookmarks associated with video content viewed by the users. Each user's transaction history may include subscriptions, purchases and rentals. Transaction history server 150 may also track a user viewing position and allow the user to view video content from a last position that the user has viewed on the same device or different devices. For example, when the user starts to view particular video content, transaction history server 150 may provide a message with different options for the user to start the video (e.g., from the beginning of the video content or where the video content was stopped the last time the user accessed the video content).

Account and profile server 152 may store a digital user profile that includes information associated with, related to or descriptive of the user's probable or observed video content activity. Account and profile server 152 may also store a user login, email, partner customer number, contact information, and other user preference information in association with each user profile.

Backend services system 160 may provide supporting systems that enhance and facilitate the video service. For example, backend services system 160 may include a billing server 162, a settlement server 164, a recommendation server 166, a physical services server 168, a customer support system 170, etc.

Billing server 162 may provide a billing API (i.e., a billing gateway) to payment and billing processing services. Billing server 162 may manage the process by which a user is charged after he/she buys, rents, or subscribes to a particular item in the video content catalog. In some instances, billing server 162 may bill for a subscription automatically each month. Billing server 162 may synchronize billing results with the entitlement server 144. Billing server 162 may provide billing services, such as access to catalog prices and user profiles for recurring subscription charges and other purchase transactions.

Settlement server 164 may provide finance and settlement between the video service provider and partner entities. Settlement server 164 may implement cost assurance and revenue assurance. Settlement server 164 may implement cost assurance to ensure that partners (such as a studio that provides content) are paid according to predetermined contracts. Settlement server 164 may implement revenue assurance to ensure that consumers pay their bills according to their purchase, rental or subscription agreement with the service provider.

Recommendation server 166 may provide a recommendation engine for video content to be recommended to customers. For example, recommendation server 166 may recommend similar movies to a particular movie that is identified in association with a particular user. In some instances, recommendation server 166 may recommend a list of movies based on the user profile of a user.

Physical services server 168 may include services that identify physical assets, such as physical assets provided by a partner entity. Physical services server 168 may include associated APIs and provide physical assets information, such as location information that may allow the system to direct users to nearest or most convenient locations for accessing physical video content (e.g., Blu-ray, DVD, etc.). Physical services server 168 may also issue credit (for purchase, rental, etc., of physical video content) in association with purchase of digital asset or subscription/rental by the user (e.g., for cross-promotion purposes between partner entities).

Customer support system 170 may manage customer support functions such as response to user feedback, questions or credit related requests.

Client devices 180 may include any device capable of communicating via a network, such as content delivery network 130. For example, client devices 180 may include consumer devices such as smartphone devices 180-*a* (Android mobile, iOS mobile, etc.), tablets 180-*b*, set top boxes 180-*c*, Internet TV devices 180-*d*, consumer electronics devices such as Xbox, PlayStation and Internet enabled TVs. Client devices 180 may include an interactive client interface, such as a graphic user interface (GUI). Client devices 180 may enable user to view video content or interact with a mobile handset or a TV set.

Client devices 180 may interact with video service provider systems to execute or carry out three main types of processes or functions. These main processes include a user authentication processes, billing and payment processes and video content delivery and protection processes. User Authentication processes may include a login process, user sessions for using authenticated API calls such as user profile access, playback subscription contents, etc. Billing and payment processes may include recurring subscription billing, charge for rental or purchases, payment settlement.

In implementations described herein, the systems and methods may implement video content delivery and protection processes. The systems may provide entitlement management for devices and video DRM protections. The systems may ensure that content is delivered in a correct (i.e., device appropriate) format for different types of devices (download or streaming) and provide licenses to unlock content for client devices 180 to play the video content.

While FIG. 1 shows a particular number and arrangement of networks and/or devices, in practice, environment 100 may include additional networks/devices, fewer networks/devices, different networks/devices, or differently arranged networks/devices than are shown in FIG. 1. For example, content delivery network 130 may be implemented as multiple devices.

Figure 2:
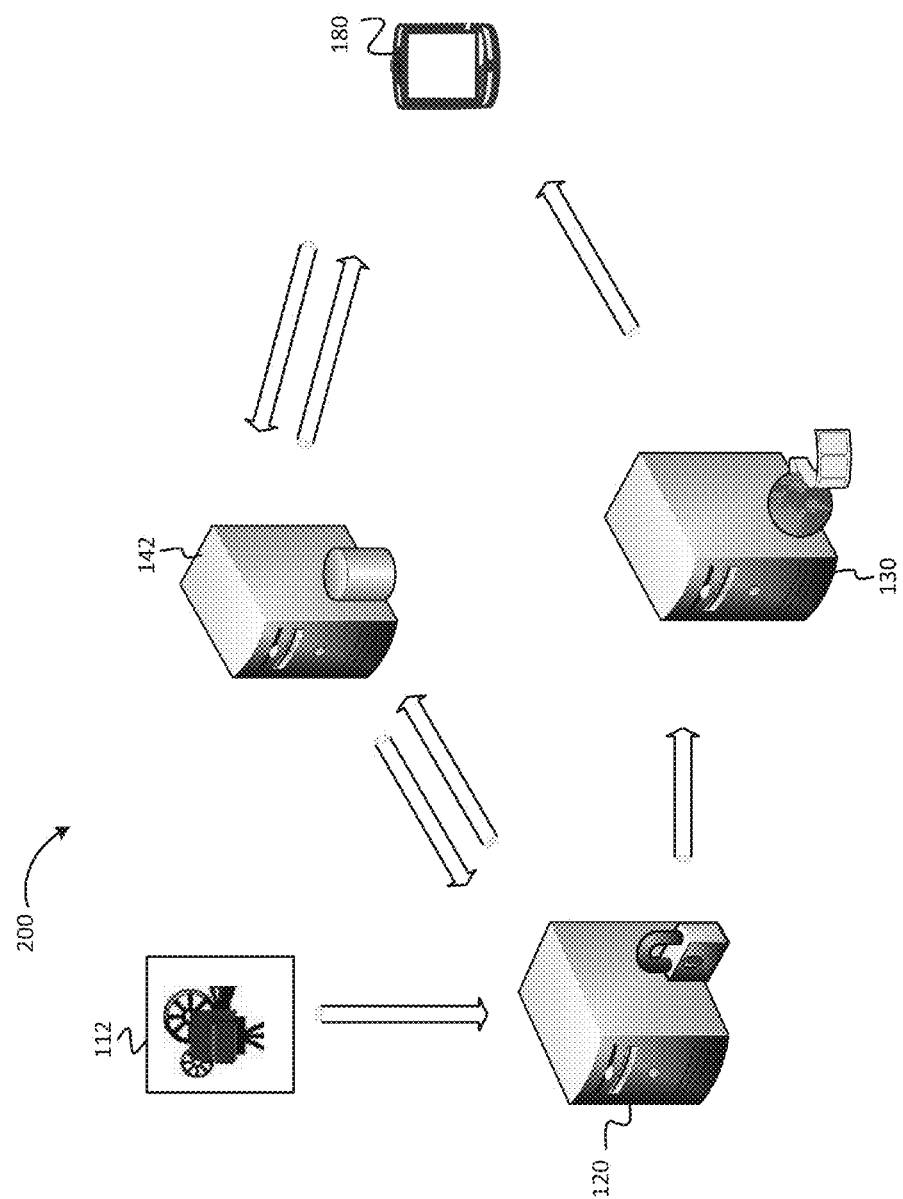
FIG. 2 illustrates a portion of the environment of FIG. 1 in which systems and methods described herein may be implemented.

FIG. 2 is a functional block diagram of a video content delivery and protection portion 200 of environment 100. Video content delivery and protection portion 200 may include components of different networks that may interface with each other to provide video content delivery and protection. As shown in FIG. 2, portion 200 may include content provider 112, content processing system 120, DRM license server 142, content distribution network 130 and client device 180.

Portion 200 may be implemented to provide DRM and video content delivery and protection for video content provided by the service provider to a user associated with client device 180. Portion 200 may be implemented to provide video content protection based on a combination of DRM that provides restrictions on conditions of access and types of usage of the video content and session based entitlement management that restricts the transfer of the video content license to particular end users and devices associated with the end users.

As shown in FIG. 2, video content from a content provider 112 may be provided to content processing system 120 and processed and distributed to client devices 180. Processing of the video content may include pre-processing, encryption, and transcoding as described hereinabove with respect to content processing system 120 and FIG. 1. Content processing system 120 may exchange secrets regarding the encryption of the video content and DRM rules associated with the video content with DRM license server 142. The DRM may protect the video content to an extent based on particular protections (e.g., copy restrictions, device restrictions). Content processing system 120 may encrypt the video content as a first step for digital right management. Content processing system 120 may transfer the encrypted content to content delivery network 130 for distribution to client devices 180.

DRM license server 142 may perform license management functions including specifying terms and conditions for access to video content by client devices 180 associated with particular customer accounts. The license management may include content policy and rules based on transitions associated with the video content for the particular customer account, such as purchase, rental or trial. DRM license server 142 may also manage key storage and distribution. DRM license server 142 may receive device information from client devices 180. DRM license server 142 may interact with content processing system 120 and content delivery network 130 in executing license management functions for client devices 180.

Licenses can have different rights, such as start times and dates, duration, and counted operations. Licenses are not transferable. If a consumer sends video content (i.e., a packaged digital media file) from client device 180 to another device (e.g., a different video playing device associated with a friend), the friend must acquire his/her own license to play the digital media file. This device-by-device licensing scheme ensures that the packaged digital media file can only be played by the device that has been granted the license key.

Client device 180 may include a client application and video content player. To play the digital media file, the consumer may require a player that supports applicable DRM (e.g., the player may support Playready or Secure Media DRM). The client application may download encrypted video from content delivery network 130 and then retrieve a DRM license to access the encrypted video content from DRM license server 142. The client application may retrieve the encrypted video content from content delivery network 130. This may be a download or a streaming URL from content delivery network 130. Client device 180 may check if the DRM license for the video content is available on client device for immediate playback of the video content. If the DRM license is already available, video content player may proceed to the play content using the decryption key inside the license. Video content player may play the file (or copy, transfer, etc.) according to the rules or rights defined by the DRM license. Otherwise, client application may get license from DRM license serve 142. The client device 180 may be identified, for example, by SSO authentication that ties identity and entitlement to the particular client device 180. The processes link the DRM with entitlement based on SSO authentication so that only entitled persons can view the video content in designated client devices 180.

Figure 3:
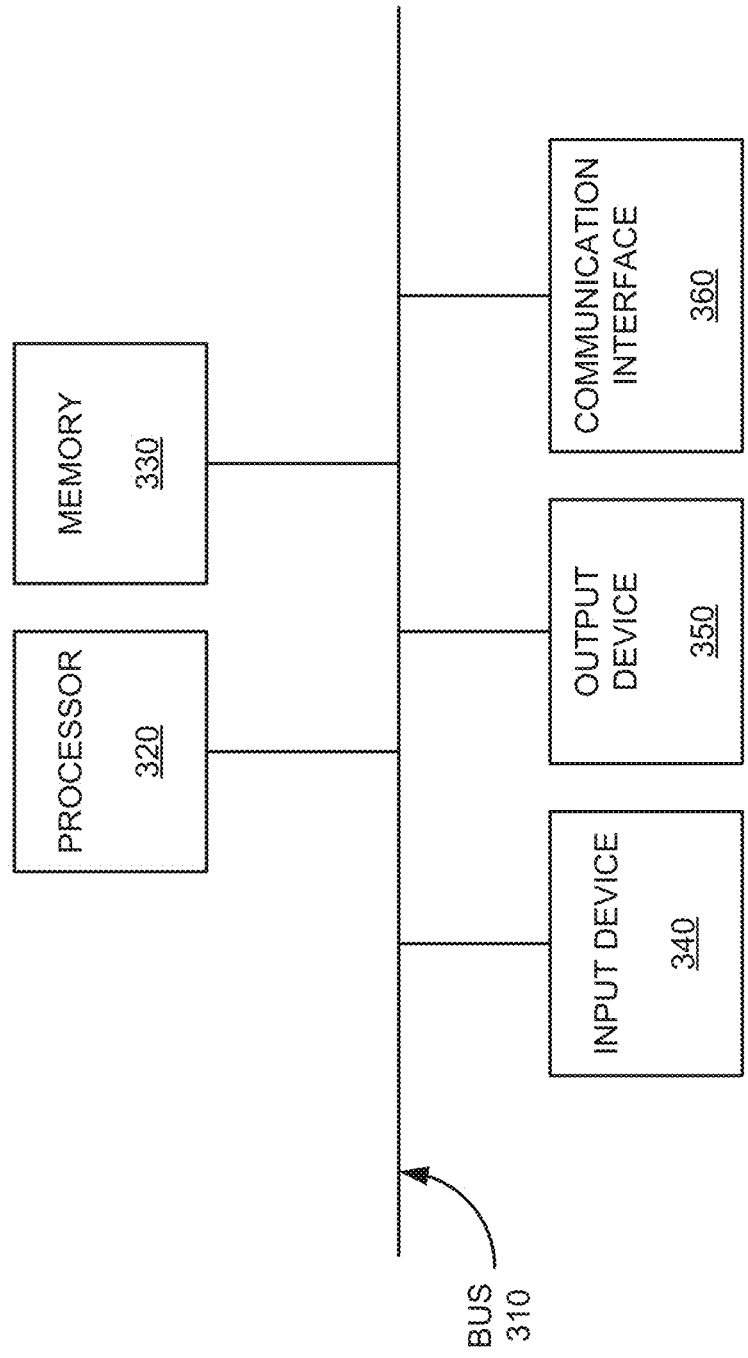
FIG. 3 illustrates an exemplary configuration of one or more of the components of FIGS. 1 and 2.

FIG. 3 is a diagram of example components of a device 300. Each of video content system 110, content provider 112, marketing console 114, physical assets 115, preprocessing server 122, transcoding server 124, encryption server 126, content delivery network 130, orchestration layer 140, DRM license server 142, an entitlement server 144, a catalog server 146, a storefront server 148, a transaction history server 150, and an account profile server 152, backend services system 160, billing server 162, settlement server 164, recommendation server 166, physical services server 168, customer support system 170, or client devices 180 may include one or more devices 300. As shown in FIG. 3, device 300 may include a bus 310, a processor 320, a memory 330, an input device 340, an output device 350, and a communication interface 360.

Bus 310 may permit communication among the components of device 300. Processor 320 may include one or more processors or microprocessors that interpret and execute instructions. In other implementations, processor 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processor 320, a read only memory (ROM) or another type of static storage device that stores static information and instructions for the processor 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include a transceiver that enables device 300 to communicate with other devices and/or systems. For example, communication interface 360 may include mechanisms for communicating with other devices, such as other devices of environment 100.

As described herein, device 300 may perform certain operations in response to processor 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Alternatively, or additionally, one or more components of device 300 may perform one or more other tasks described as being performed by one or more other components of device 300.

Figure 4:
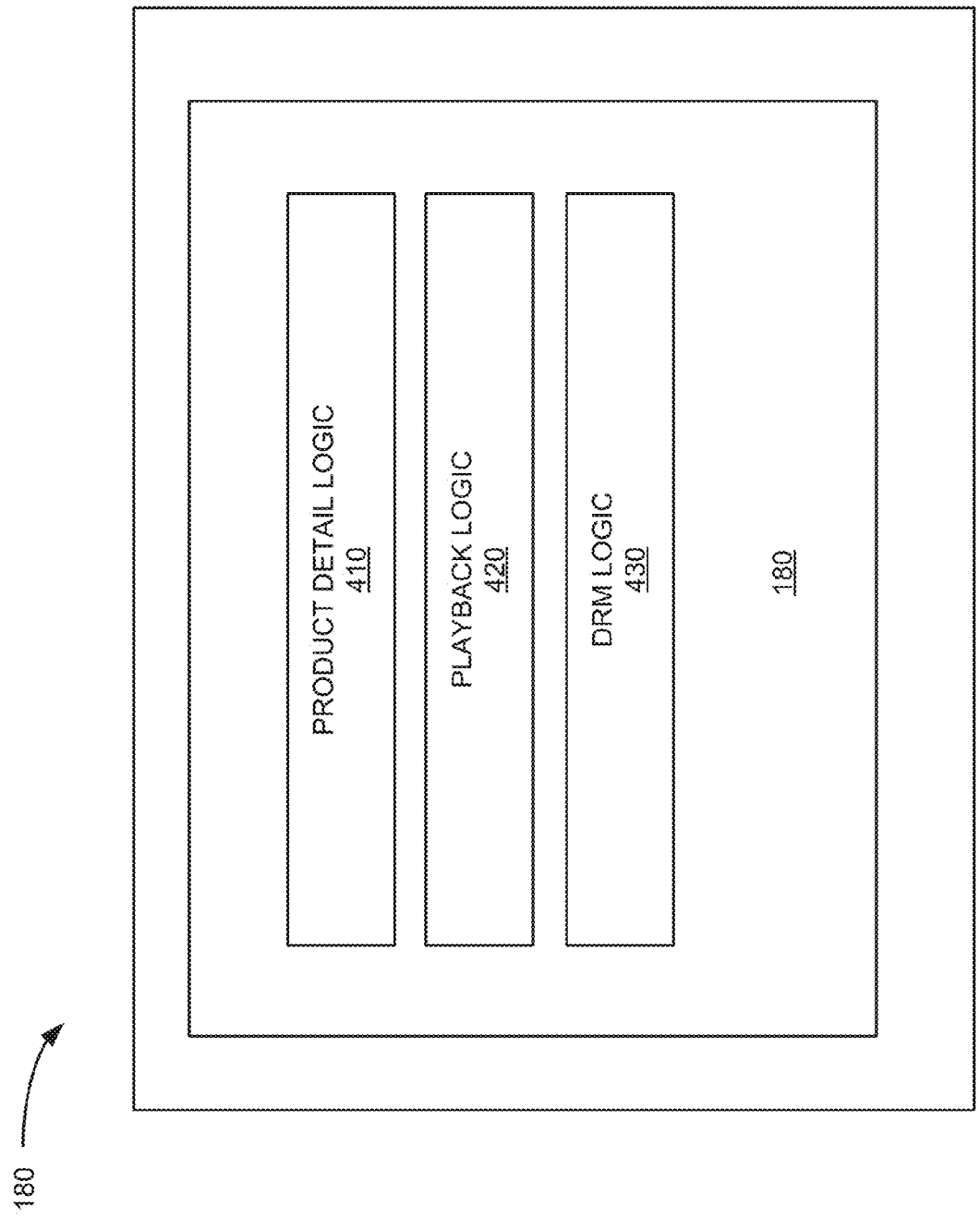
FIG. 4 is a diagram of exemplary functional components of the client device of FIG. 2.

FIG. 4 is a functional block diagram of components of client device 180 in which systems and/or methods described herein may be implemented. Client device 180 may comprise machine-readable instructions, hardware, or a combination of hardware and machine-readable instructions. Client device 180 may include product detail logic 410, playback logic 420, and DRM logic 430.

Product detail logic 410, playback logic 420, and DRM logic 430 may implement application data flows on client device 180 for playing video content in a secure manner based on the identity of the user, the particular client device 180 (i.e., an identifier for the client device 180) and DRM restrictions associated with the video content for the user via processes executed on client device 180 and interactions on the client side such as shown in FIG. 2.

Product detail logic 410 may request detail information for video content items from orchestration layer 140 in response to input provided by an end user. For example, store front server 148 may provide access (via an API) to a video content catalog in a browser displayed in a graphical user interface (GUI) of client device 180. The end user may browse to a display page for video content information (e.g., a client device 180 may display a listing of movies based on a user initiated search, recommendations, etc.). The user may select a particular video content item to receive additional details. Product detail logic 410 may send a request to orchestration layer 140 for video content information (e.g., movie detail information) based on an identifier associated with the video content item (e.g., an identifier named "GetProductDetailsByProductID"). In response to receiving the request including GetProductDetailsByProductID, orchestration layer 140 may provide the requested information and product detail logic 410 may return and display a detail page that includes video content details such as a description, trailer, and recommendation. Product detail logic 410 may also retrieve a purchase option identifier (PurchaseOptionID), which may be used to access a play back URL.

Playback logic 420 may retrieve the playback URL from orchestration layer 140 in response to input provided by the end user to begin playing the video content. Playback logic 420 may initiate a call (or implement a command) that retrieves the playback URL ("Get Playback URL") based on input provided by the user that identifies the specific user and client device 180. The call between playback logic 420 may be protected based on session based user authorization (e.g., the call may be SSO-protected by user login and password). Playback logic 420 may transmit request parameters in the call that include a partner customer number (PCN) for (that identifies to the partner) the user, a purchase option ID that identifies the selected video content that the user wants to view, a Device ID for the playing client device 180, a device specification for video format/profile and a video delivery type (i.e., whether the video content is to be delivered and viewed by single download or by streaming to the client device 180).

If the call is successful, playback logic 420 may receive a message that includes required playback information from orchestration layer 140. The playback information may include fields such as a CDN (i.e., content delivery network 130) URL for the streaming/download URL from content delivery network 130, a video position indicator to identify where the user stopped watching last time if any, by default it is the beginning of the movie ("Progress Watch Indicator"), an entitlement ID (e.g., a value EntitlementID), which is a value that client device 180 must present if the user is entitled to watch the movie and is required to pass in subsequent DRM license request call, short-lived entitlement token (a token that is valid for a limited duration) for entitlement check during license request, and a playback location indicator that indicates the playback location for starting the video content and is reported to orchestration layer 140.

DRM logic 430 may implement the remaining steps for access to the video content. The remaining steps for access to the video content may be determined based on a type of DRM used to encrypt and protect the video content. For example, DRM logic 430 may implement DRM based on a DRM associated with different platforms, DRM providers or processes, such as described with respect to FIG. 6 or FIG. 7 below.

Figure 5:
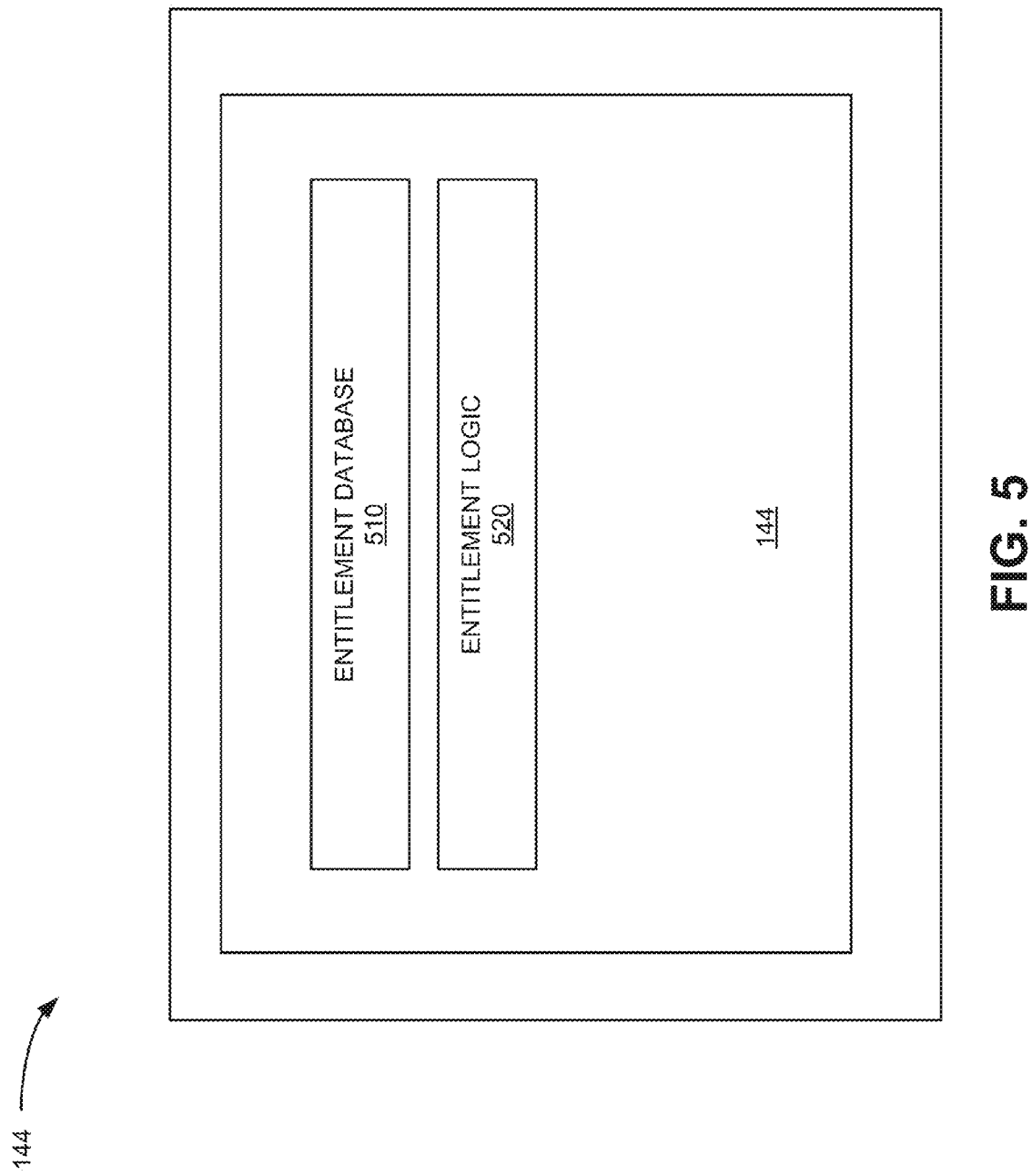
FIG. 5 is a diagram of exemplary functional components of the entitlement server of FIG. 1.

FIG. 5 is a functional block diagram of components of entitlement server 144 in which systems and/or methods described herein may be implemented. Entitlement server 144 may comprise machine-readable instructions, hardware, or a combination of hardware and machine-readable instructions. Entitlement server 144 may include an entitlement database 510, and entitlement logic 520.

In addition to the DRM protection provided in association with DRM license server 142, entitlement logic 520 may provide additional protection by application session control.

Entitlement logic 520 may associate video content items in the entitlement database 510 that correspond to media files in the video content catalog to a user's profile to enforce what content a user has the right to view and on which device(s). For example, if the user bought the movie "Super Duper Heroes," then entitlement logic 520 may allow the user to view the purchased movie on an identified particular client device 180.

A transaction history for each user, stored or provided by transaction history server 150 is linked to user profile so that entitlement logic 520 may verify user payment record before issuing playback license for user to play particular video content.

Figure 6:
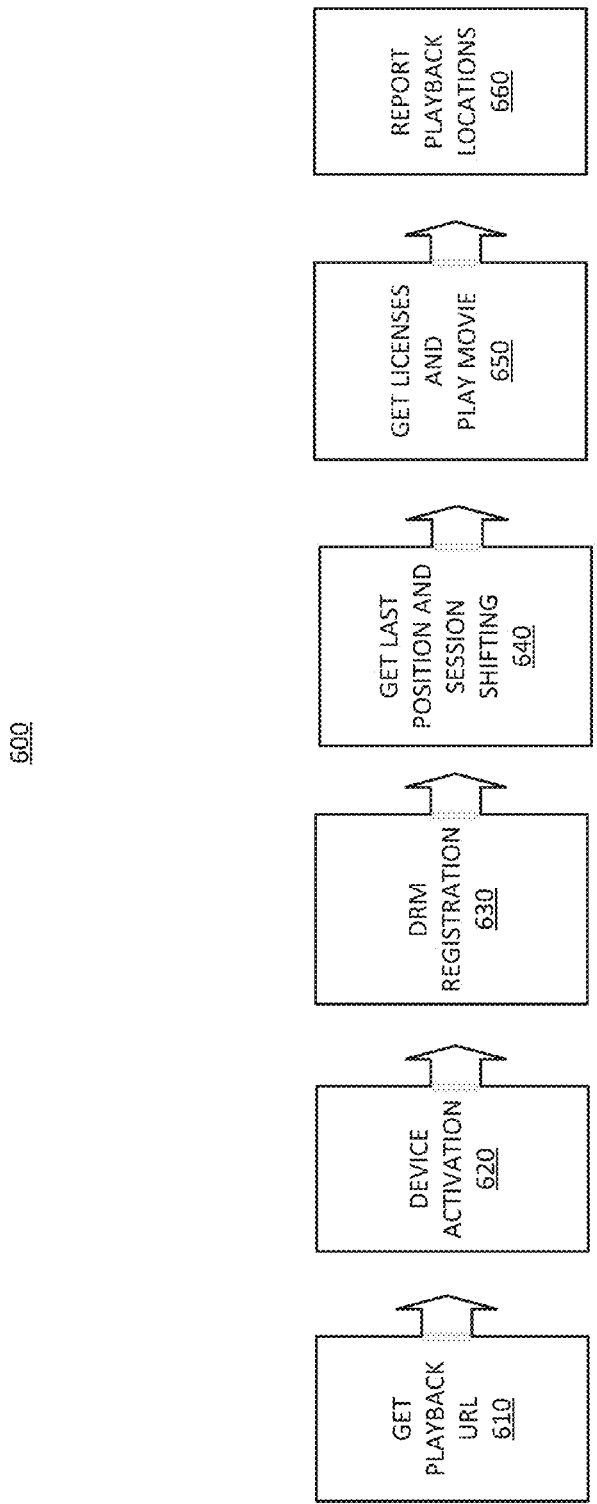
FIG. 6 illustrates an implementation of a digital rights management (DRM) call flow for playing video based on customer entitlement.

FIG. 6 is a diagram illustrating an application call flow 600 for a DRM process 600 to complete video content protection on client device 180. Application call flow 600 may be implemented by DRM logic 430 to complete the video protection process of FIG. 4 described hereinabove.

As shown in FIG. 6, application call flow 600 may begin when client device requests a playback URL (Get playback URL) (block 610). DRM logic 430 may check if client device 180 is activated by communicating with orchestration layer 140 (Get Devices API). If client device 180 is not activated, DRM logic 430 may call orchestration layer 140 and request activation of client device 180. Orchestration layer 140 may activate client device 180 via an associated API (Activate Device API) (block 620). Orchestration layer 140 will store device information in an associated database table (entitlement server 144). The device information may include device ID, partner customer number for user.

DRM logic 430 may DRM register client device 180 with a DRM management entity associated with the service provider by calling a designated DRM registration entity via an API provided for contacting the DRM registration entity (block 630). The API may trigger a DRM server call to a URL associated with a DRM management entity associated with a partner entity for physical video content that provides access to the video content (e.g., the URL may identify the partner entity and a type of service offered, e.g., https://api.partner-entitydownload.com/drms/drmservice, in which partnerentity indicates a particular partner entity and drmservice indicates the type of DRM service).

DRM logic 430 may include application data required for registration in the DRM server call to the URL associated with the DRM management entity, DRM logic 430 may attach app-data that includes an app data identifier, a partner customer number, and a device ID formatted in a similar format as:

```
<appData>
<partnerCustomerNumber>11437352287511</partnerCustomerNumber>
<deviceId>12345333333333333334444</deviceId>
</appData>
```

The API will verify with orchestration layer 140 to verify that client device 180 has previously been registered in orchestration layer 140 (i.e., DRM license server 142) otherwise this registration will fail (i.e., orchestration layer 140 may identify that the client device 180 is not registered and provide notification to client device 180).

DRM logic 430 may retrieve a playback location (GetPlaybackLocation) (block 640) and session shifting (e.g., from a previous viewing session at another client device 180 associated with the user) to where the video content stopped last time. Client application may store this location so that video content player may start play from this location.

DRM logic 430 may instruct video player to play the video content (block 650) for example by streaming through a secure API. The URL for transmitting (e.g., streaming or download) the video content may have been received in response to the command GetPlaybackURL described at block 610.

Video content may send a start position and session shifting location (which may be zero by default) to the streaming server with app data formatted in a similar manner as:

```
<appData>
<partnerCustomerNumber>11437352287511</partnerCustomerNumber>
<componentId>6c17b04a-ff30-4a70-b798-17b37ca1bb34</componentId>
<deviceId>12345333333333333334444</deviceId>
<entitlementId>a6647c5b-c976-45af-86d5-aea0d05f4fa0</entitlementId>
</appData>,
``` in which deviceId indicates a device indicator for the particular client device 180, and component ID indicates a particular component.

DRM logic 430 may provide app data that may be used in obtaining the playback licenses before playback can start (block 660). DRM license server 142 may verify device ID and user data (e.g., PartnerCustomerNumber) with entitlement server 144 to make sure that the user is entitled to the DRM license on the client device 180 and that DRM license server 142 is to grant the DRM license to the requesting client device 180.

Video content player may add playback events to data transmitted to orchestration layer 140. Playback events are indicators of particular activity of the user (or client device 180) towards the video content. For example, DRM logic 430 may send an indicator at predetermined intervals (e.g., every 60 seconds) that the video content is playing. Video content player may add playback events for video content player commands including stop, fast forward, rewind, return, pause, etc. Video content player may also send call session shifting API to orchestration layer 140 to ensure tracking for session shifting.

Figure 7:
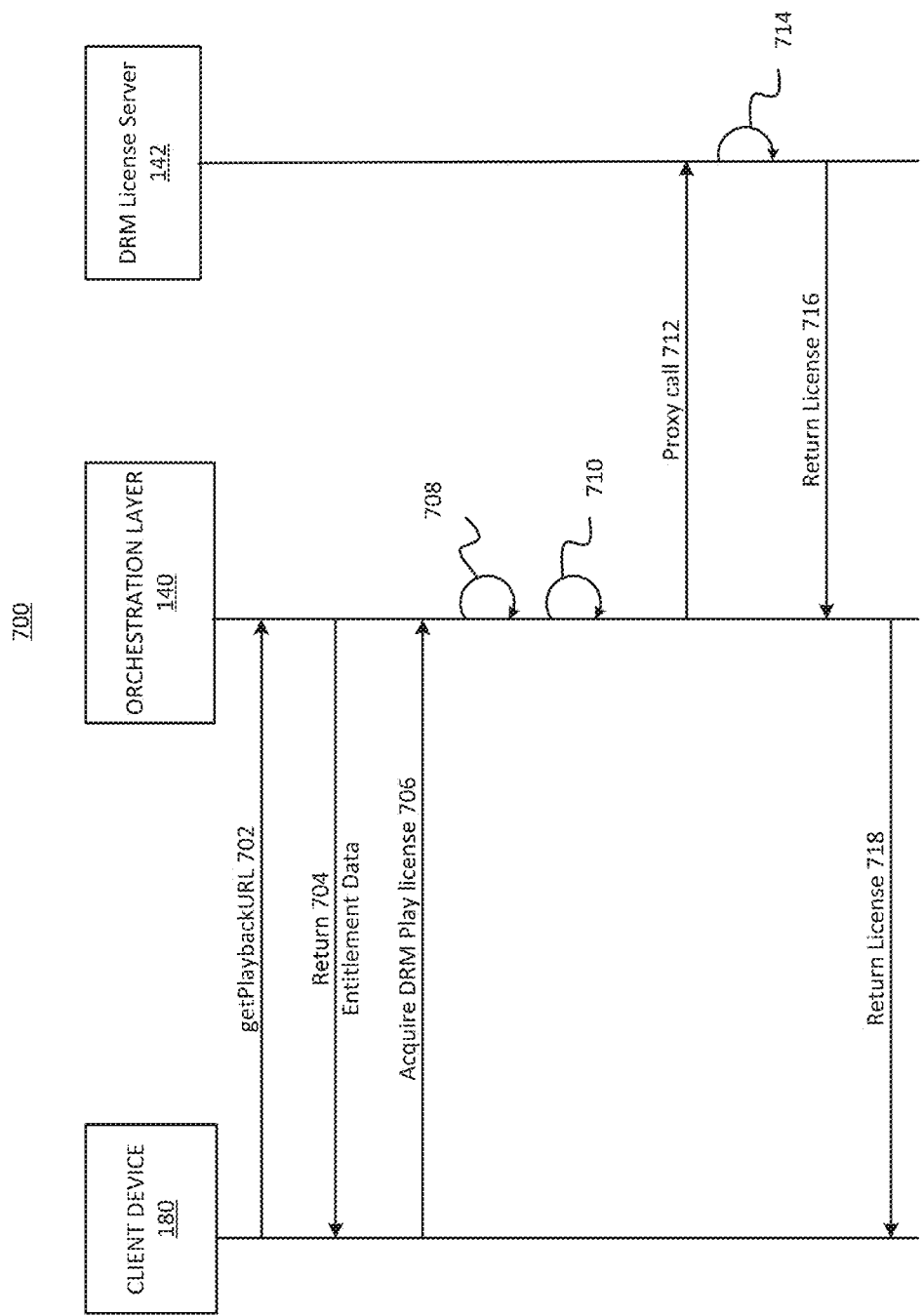
FIG. 7 illustrates an implementation of another DRM call flow for playing video based on customer entitlement.

FIG. 7 is a diagram illustrating an application call flow 700 for another DRM process 700 to complete video content protection on client device 180. Application call flow 700 may be implemented by DRM logic 430 and the video content player on client device 180 to complete the video protection process of FIG. 4 described hereinabove. All communications between client device 180 and orchestration layer 140 or between orchestration layer 140 and content delivery network 130 in this call flow may be encrypted based on, for example, HTTPS protocol.

As shown in FIG. 7, application call flow 700 may begin when DRM logic 430 (i.e., client device 180 via video content player) initiates video playing of video content by requesting the video content (GetPlaybackURL 702) from orchestration layer 140. Orchestration layer 140 may return entitlement data for the user and client device 180 (return 704), such as an entitlement ID, a component ID, and an entitlement token.

Client device 180 may send a request to obtain DRM licenses for the video content through orchestration layer 140 (acquire DRM license 706). The video content player may pass required information to acquire the DRM license, such as PCN, EntilementID, ComponentID and EntilementToken as customer data (or app data) to orchestration layer 140. Orchestration layer 140 may verify (708) a session cookie associated with the user on client device 180 (i.e., an identifier that enables the orchestration layer to keep track of user activity) to make sure user is in session. Orchestration layer 140 may also verify (710) that PCN was passed with the PCN in session. Orchestration layer 140 may then pass the required entitlement information (PCN, EntilementID, ComponentID and EntilementToken), e.g., via proxy call, from client device 180 to DRM license server 142 (712).

DRM license server 142 may receive the entitlement information via the proxy call from orchestration layer 140. DRM license server 142 may validate the entitlement information (714) received in the proxy call from orchestration layer 140 and issue a DRM license through orchestration layer 140 (return license 716) to client device 180. DRM logic 430 may receive the DRM license and allow playback on client device 180.

According to one embodiment, DRM license server 142 may be behind the orchestration layer 140 (from the perspective of the client device 180) and in a private network, which is not exposed to the Internet. Any non-web client's license call is required to go through orchestration layer 140 first, and is therefore required to be authorized by a SSO or other session based user authorization mechanism and then relayed to DRM license server 142. For the web client, the license call may go through a server associated with a partner entity (e.g., a physical video content providing partner) and may receive SSO protection, after which the partner entity server may relay the call to orchestration layer 140. Orchestration layer 140 may send the call to DRM license server 142.

Figure 8:
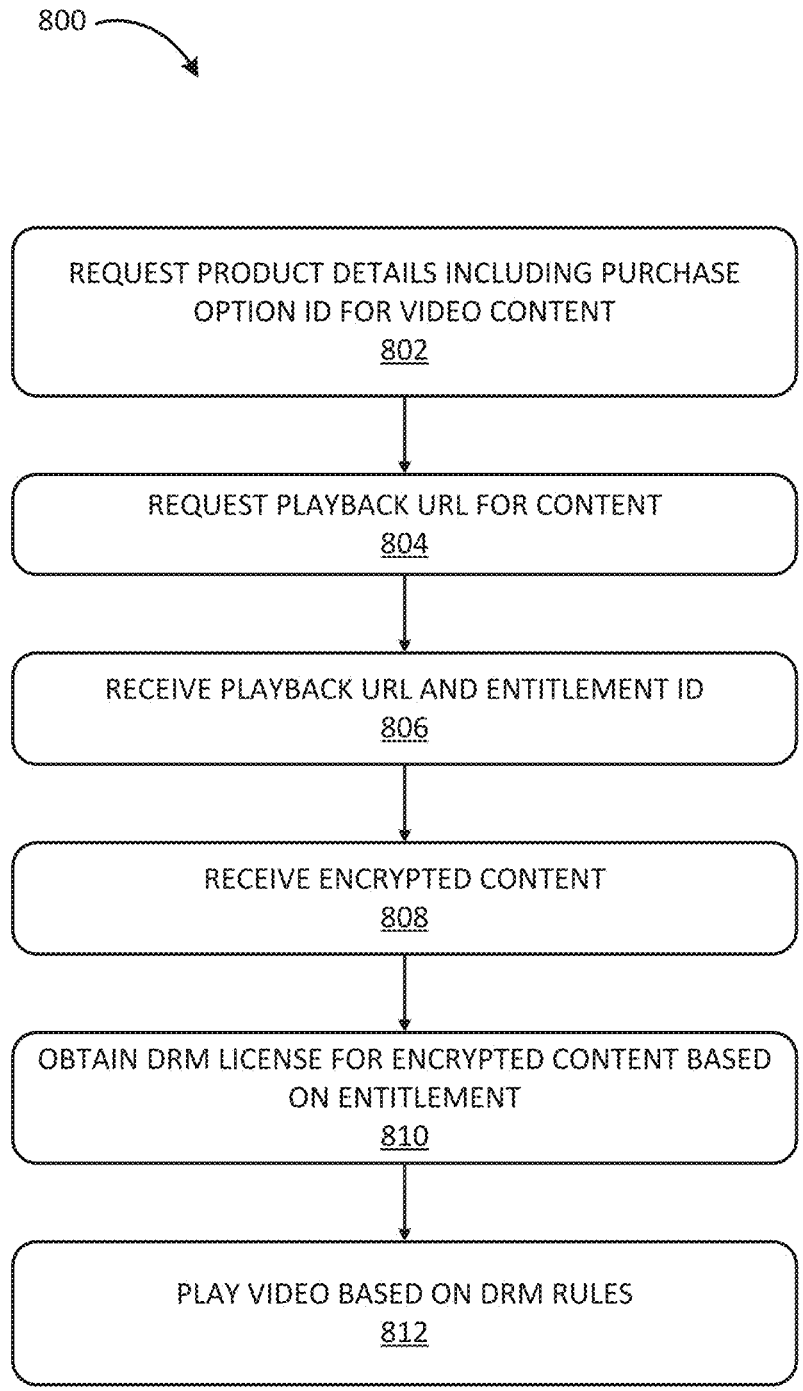
FIG. 8 is a flowchart of an exemplary process for providing video content protection based on customer entitlement.

FIG. 8 is a flowchart of an exemplary process 800 for providing video content protection based on customer entitlement. Process 800 may execute in client device 180. In another implementation, some or all of process 800 may be performed by another device or group of devices, including or excluding client device 180. It should be apparent that the process discussed below with respect to FIG. 8 represents a generalized illustration and that blocks/steps may be added or existing blocks/steps may be removed, modified or rearranged without departing from the scope of process 800.

At block 802, client device 180 may request video content details including a purchase option ID. For example, client device 180 may request the movie details in response to user input while browsing items in a (portion of) video content catalog displayed in a GUI of client device 180. The video content details may include a description, trailer, recommendation, etc.

Client device 180 may request a playback URL for the video content (block 804). For example, client device 180 may place an SSO-protected call to orchestration layer 180. The SSO-protected call may be protected by user login and password. The request parameters of the call may include PCN for the user, purchase option ID for the video content, device ID for the client device 180, device specification for video format/profile, and video delivery type (download or streaming).

Client device 180 may receive the playback URL (e.g., a content delivery network 130 URL for the video content), a progress watch indicator, and an entitlement ID (block 806). Client device 180 may retrieve the encrypted content from the playback URL (block 808). For example, client device 180 may stream or download the encrypted content.

Client device 180 may obtain DRM licenses through orchestration layer 140 based on DRM associated with the encrypted content and session based user authorization of the user on the client device 180 (block 810). For example, client device 180 may carry the user credential or session cookie to acquire the license, and entitlement sever 144 may authorize the request. Session based user authorization in this instance may be implemented using, for example, SSO.

At block 812, client device 180 may decrypt the encrypted video content and play the video content based on DRM rules associated with the video content. Client device 180 may report a position in the video content to orchestration layer 140.

Systems and/or methods described herein may provide protection for video content based on DRM rules associated with the video content and session based user authorization mechanism for a user that is entitled to access the video content.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 8, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the embodiments unless explicitly described as such. Also, as used herein, the articles "a", "an" and "the" are intended to include one or more items. Further, the phrase "based on" is intended to mean "based, at least in part, on" unless explicitly stated otherwise.

What is claimed is:

1. A computer-implemented method comprising:
   receiving, by a client device associated with a particular user, product details for video content including a purchase option identifier (ID) for the video content from a video service provider;
   requesting, by the client device based on a single sign on (SSO) protected call, a playback uniform resource locator (URL) for the video content from an orchestration layer associated with the video service provider;
   receiving the playback URL and an entitlement ID associated with the particular user for the video content;
   receiving an encrypted content based on the video content;
   obtaining a digital rights management (DRM) license for the encrypted content based on the entitlement ID, wherein obtaining the DRM license for the encrypted content includes registering the client device based on a partner customer number (PCN) for the particular user, and a device ID for the client device; and
   decrypting and playing the video content based on DRM rules associated with the video content.

2. The computer-implemented method of claim 1, wherein receiving the product details further comprises:
   receiving one or more of a description, a trailer, or a recommendation for the video content.

3. The computer-implemented method of claim 1, wherein requesting the playback URL further comprises:
   sending the purchase option ID for the video content, the partner customer number for the particular user, the device ID for the client device, a video format type for the video content, and a video delivery type for the video content to the video service provider.

4. The computer-implemented method of claim 1, wherein receiving the playback URL further comprises:
   receiving a position indicator for the video content, wherein the position indicator identifies a last point that the particular user viewed the video content.

5. The computer-implemented method of claim 1, wherein receiving the playback URL further comprises:
   receiving session shifting information for the video content.

6. The computer-implemented method of claim 1, wherein receiving the playback URL further comprises:
   receiving an entitlement token, wherein the entitlement token is a limited duration token to enforce entitlement of the particular user for the video content.

7. The computer-implemented method of claim 1, wherein obtaining the DRM license further comprises:
   determining whether the client device is activated with the video service provider; and
   providing device information for the client device in response to a determination that the client device is not activated.

8. The computer-implemented method of claim 1, further comprising:
   playing the video content through a secure video player, wherein playing the video content requires the entitlement ID, the PCN, a component ID, and the device ID.

9. The computer-implemented method of claim 1, further comprising:
   adding a playback event for predetermined intervals of the video content.

10. The computer-implemented method of claim 1, further comprising:
    adding a playback event for one or more of stopping, pausing, rewinding, or fast forwarding the video content.

11. The computer-implemented method of claim 1, wherein decrypting and playing the video content based on DRM rules further comprises:
    playing the video content based on one or more of limited transferability of the video content, limited copying, or limited views of the video content.

12. The computer-implemented method of claim 1, further comprising:
    sending a request for the DRM license through the orchestration layer, wherein the orchestration layer verifies if the particular user is in session;
    providing the PCN, the entitlement ID, a component ID, and an entitlement token to the orchestration layer; and
    receiving the DRM license based on the PCN, the entitlement ID, the component ID, and the entitlement token.

13. A client device, comprising:
    a memory to store a plurality of instructions; and
    a processor configured to execute the instructions in the memory to:
    associate the client device with a particular user based on a session based user authorization system;
    receive, from a video service provider, product details for video content including a purchase option identifier (ID) for the video content;
    request a playback uniform resource locator (URL) for the video content;
    receive the playback URL and an entitlement ID associated with the particular user for the video content;
    receive an encrypted content based on the video content;
    request a digital rights management (DRM) license for the encrypted content based on the entitlement ID, wherein requesting the DRM license for the encrypted content includes registering the client device based on a partner customer number (PCN) for the particular user, and a device ID for the client device;
    receive the DRM license; and
    decrypt and play the video content based on DRM rules associated with the video content.

14. The client device of claim 13, wherein, when receiving the product details, the processor is further to:
    receive one or more of a description, a trailer, or a recommendation for the video content.

15. The client device of claim 13, wherein, when requesting the playback URL, the processor is further to:
    send the purchase option ID for the video content, the partner customer number for the particular user, the device ID for the client device, a video format type for the video content, and a video delivery type for the video content to the video service provider.

16. The client device of claim 13, wherein, when receiving the playback URL, the processor is further to:
    receive a position indicator for the video content, wherein the position indicator identifies a last point that the particular user viewed the video content.

17. A non-transitory computer-readable medium including instructions to be executed by a processor, the instructions including one or more instructions, when executed by the processor, for causing the processor to:
    associate a client device with a particular user based on a single sign on (SSO);
    receive, from a video service provider, product details for video content including a purchase option identifier (ID) for the video content;
    request a playback uniform resource locator (URL) for the video content;
    receive the playback URL and an entitlement ID associated with the particular user for the video content;

receive an encrypted content based on the video content;

request a digital rights management (DRM) license for the encrypted content based on the entitlement ID, wherein requesting the DRM license for the encrypted content includes registering the client device based on a partner customer number (PCN) for the particular user, and a device ID for the client device;

receive the DRM license; and decrypt and play the video content based on DRM rules associated with the video content.

18. The non-transitory computer-readable medium of claim 17, wherein the one or more instructions further include instructions for causing the processor to:

receive one or more of a description, a trailer, or a recommendation for the video content.

19. The non-transitory computer-readable medium of claim 17, wherein the one or more instructions further include instructions for causing the processor to:

send the purchase option ID for the video content, the partner customer number for the particular user, the device ID for the client device, a video format type for the video content, and a video delivery type for the video content to the video service provider.

20. The non-transitory computer-readable medium of claim 17, where the one or more instructions further includes instructions for causing the processor to:

receive a position indicator for the video content, wherein the position indicator identifies a last point that the particular user viewed.

* * * * *